(12) United States Patent
Harley

(10) Patent No.: US 8,471,811 B2
(45) Date of Patent: Jun. 25, 2013

(54) PUCK-BASED POINTING DEVICE THAT PROVIDES MULTIPLE BUTTONS

(75) Inventor: Jonah Harley, Mountain View, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 2023 days.

(21) Appl. No.: 11/021,300

(22) Filed: Dec. 23, 2004

(65) Prior Publication Data

US 2006/0139323 A1 Jun. 29, 2006

(51) Int. Cl.
*G06F 3/033* (2006.01)

(52) U.S. Cl.
USPC .......................................... 345/157

(58) Field of Classification Search
USPC ............. 345/156–169; 463/37–38; 178/18.01
See application file for complete search history.

(56) References Cited

U.S. PATENT DOCUMENTS

| | | | |
|---|---|---|---|
| 6,285,356 B1 | 9/2001 | Armstrong | |
| 2003/0058219 A1 | 3/2003 | Shaw | |
| 2004/0119687 A1* | 6/2004 | Suzuki et al. | 345/156 |

FOREIGN PATENT DOCUMENTS

| | | |
|---|---|---|
| JP | 9134248 | 5/1997 |
| JP | 2004-93442 | 3/2004 |
| WO | WO-2004/109486 | 12/2004 |

OTHER PUBLICATIONS

Apple Computer, Inc., "User's Guide", www.apple.com/about/environment.com, (2004).
Carlson, Jeff "Apple Introduces Click Wheel iPods", http://db.tidbits.com/article/7745, (Jul. 19, 2004).
HSE Computer GMBH, "Apple iPod Modell bestimmen", (2003).

* cited by examiner

*Primary Examiner* — Rodney Amadiz

(57) ABSTRACT

A pointing device having a puck that is confined to move in a field of motion on a surface and that provides pointing and clicking functions analogous to those of a conventional mouse is disclosed. The puck has first and second members that are spaced apart from one another by a resilient spacer when no force is applied between the members. The puck includes a tilt mechanism for allowing the first and second members to assume a tilted configuration with respect to one another in response to a force being applied between the first and second members. A position detector determines the position of the puck in the puck field of motion and a tilt position of the first member with respect to the second member. The determined tilt position is used to emulate two or more switches that are actuated by varying the tilt position.

11 Claims, 6 Drawing Sheets

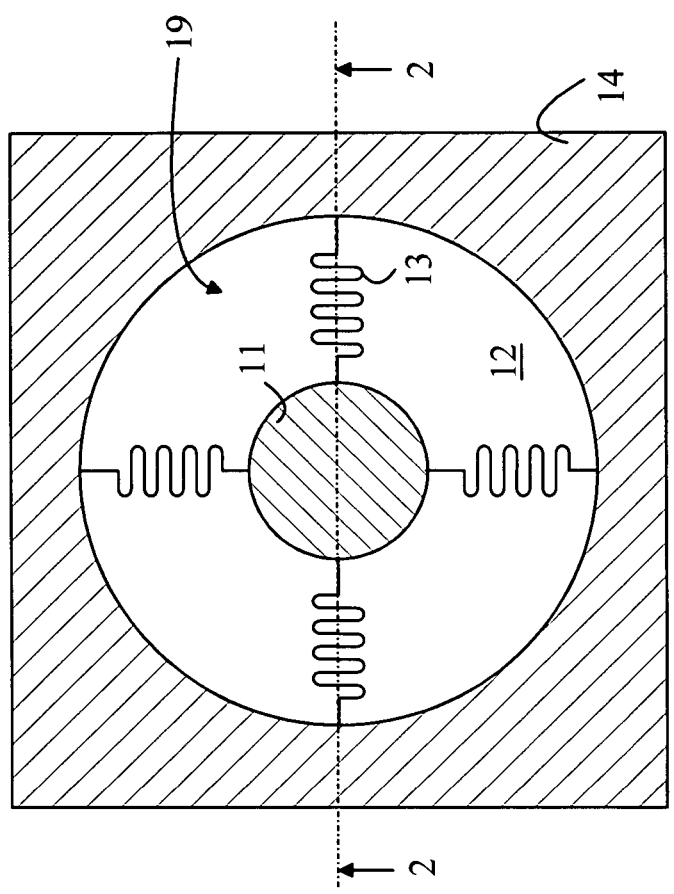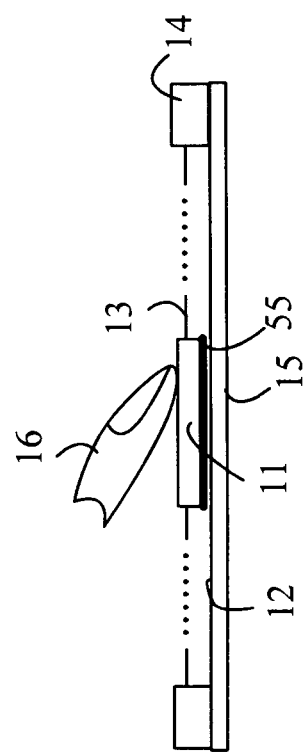

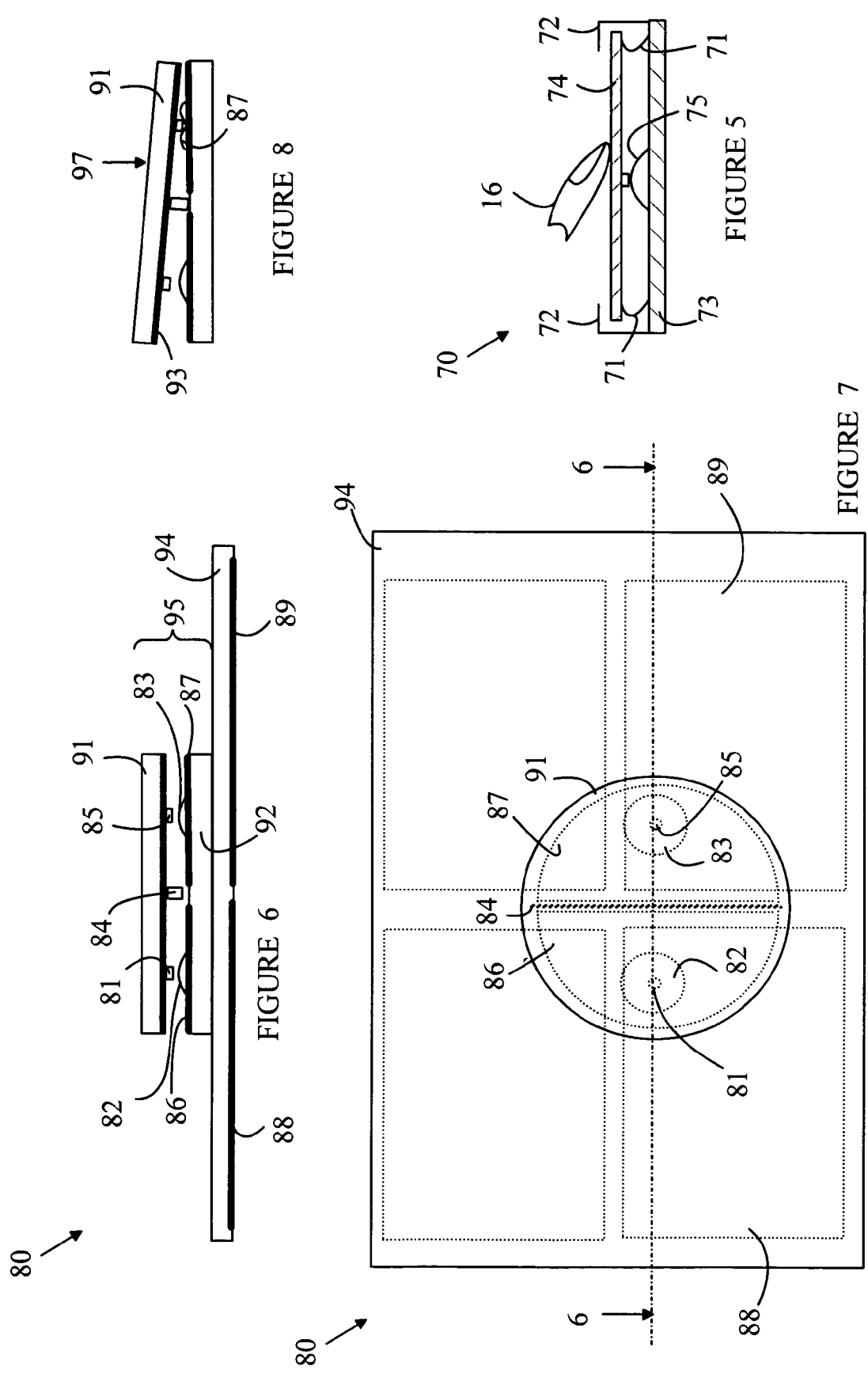

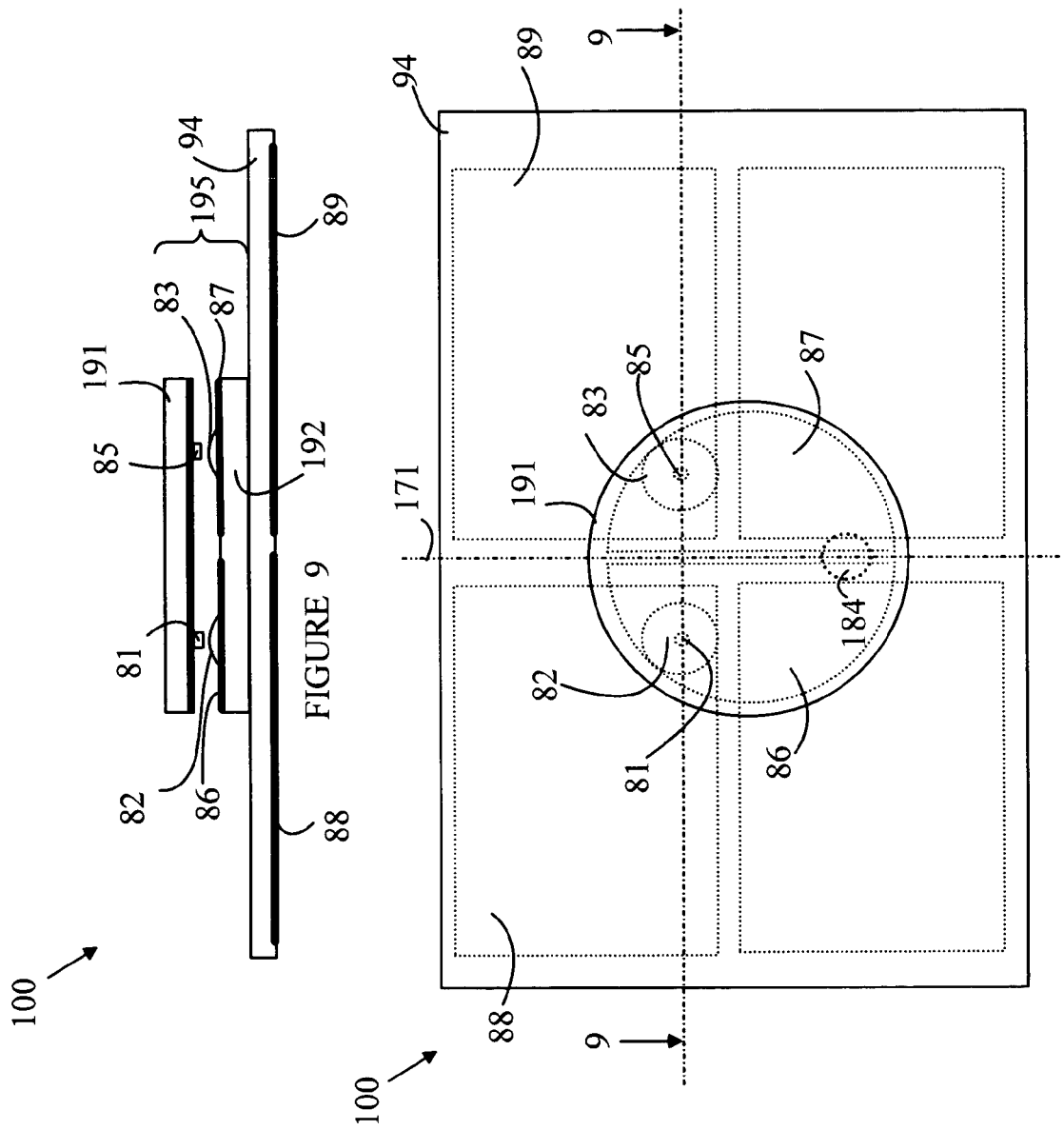

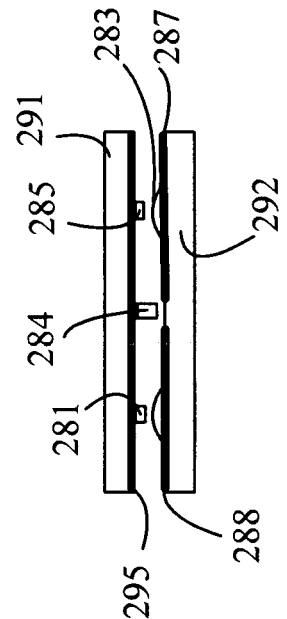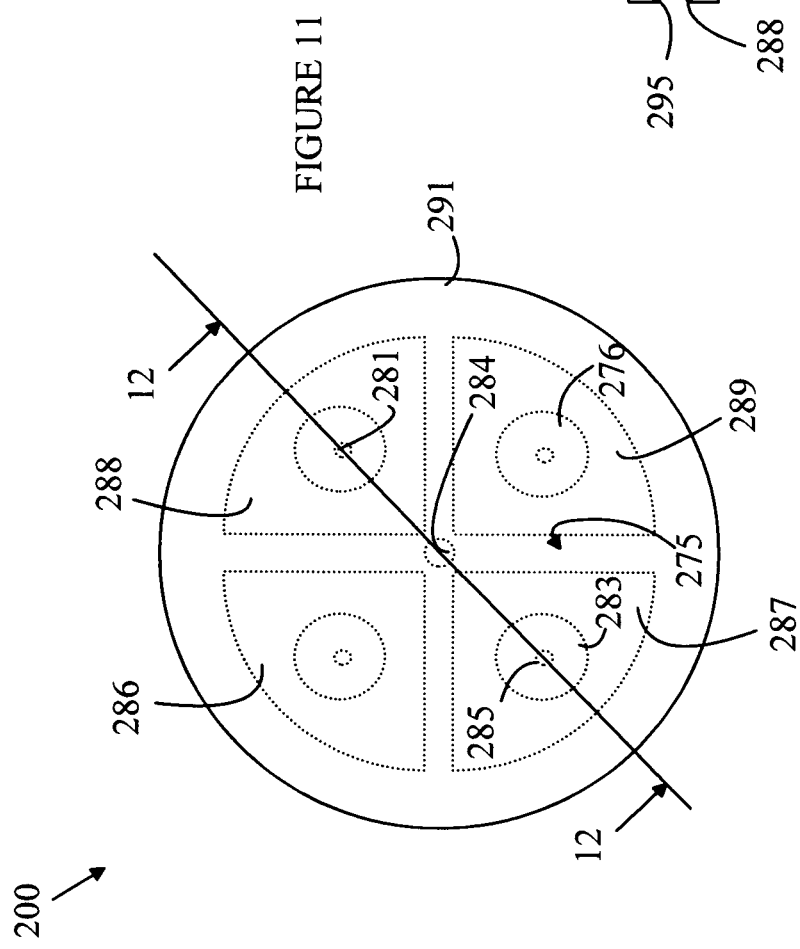

PUCK-BASED POINTING DEVICE THAT PROVIDES MULTIPLE BUTTONS

BACKGROUND OF THE INVENTION

Modern computer operating systems and graphics programs require a pointing device for controlling the position of a cursor on the computer display. Likewise, handheld devices such as personal information managers and cell phones would also benefit from the inclusion of such a pointing device. For desktop PCs, the most successful pointing device is the "mouse". A mouse is a hand held object that is moved over a flat surface near the keyboard to control the motion of a cursor on the computer display. The direction and distance over which the mouse is moved determines the direction and distance the cursor moves on the display. A conventional mouse provides a rigid object that a user can move with great precision. For a desktop computer, the mouse provides a satisfactory solution to the pointing problem. On the occasion when the workspace is not large enough to provide a path over which the mouse can move and accommodate a desired cursor movement on the screen, the user simply picks up the mouse and recenters the mouse in the workspace.

In addition to providing the above-described pointing function, the mouse has evolved to include additional buttons and wheels that are used to provide other forms of input to the computer that can be activated without requiring the user to release the mouse and enter a keystroke on a keyboard. For example, most mouse designs now have additional button(s) for signaling application specific action(s) such as displaying a menu from which the user can select other functions. In addition, a scroll wheel is provided in many designs. The scroll wheel is used to scroll text on the screen or to control other multi-valued functions in specific applications. For example, the zoom level in many graphics programs can be increased or decreased by rotating the scroll wheel.

While the mouse has provided a satisfactory solution to the pointing device problem in the desktop PC market, a similarly successful device is not available for portable and hand-held computers. These computers are often used in environments that lack a sufficiently large flat surface near the keyboard over which a mouse can be moved. In addition, the need to carry a separate pointing device makes the mouse less than ideal for these applications. Hence, some other form of pointing device is needed when these computers are used in such environments.

A pointing device for use in these environments must solve the problem of moving a cursor quickly and accurately. In addition, the device must operate in an intuitive fashion that a novice user can comprehend without extensive instruction. In addition, the pointing device must operate in a limited workspace and fit within the form factor of the computer or hand held device. Finally, the usual constraints of low cost, low power consumption and high reliability must also be met.

Currently, there are two dominant solutions to the pointing device problem in the laptop marketplace, the Synaptics capacitive TouchPad™ and the IBM TrackPoint™. Other companies make versions of these devices with similar functionality. Both of these devices fall far short of satisfying the above requirements. The TrackPoint™ is a small button that is typically placed in the center of the laptop keyboard. The button may be moved in a manner analogous to a "joy stick" by applying a lateral force to the top of the button with a finger. Unfortunately, the button can only move a small amount; hence, the displacement of the button cannot be mapped directly into a displacement in the cursor position on the computer display. Instead, the button displacement controls the direction and speed with which the cursor moves. The accuracy with which a user can position the cursor using this type of velocity control is significantly less than that achieved with a conventional mouse. This limitation is particularly evident in tasks that require small, precise movements such as drawing in a computer graphics program. In addition, this type of pointing device does not provide the button functionality.

The TouchPad™ is a blank rectangular pad, 50 to 100 mm on a side, typically placed below the keyboard of most laptops. The device senses the position of a finger on the surface of the rectangle relative to the edges of the device. This sensing is accomplished by measuring the capacitance changes introduced by a user finger on a series of electrodes beneath an insulating, low-friction material.

Like the TrackPoint™, the TouchPad™ also suffers from lack of precision. It is inherently difficult to measure the capacitive changes introduced by the user, who is at an unknown potential relative to the circuit. Furthermore, the contact area of the user's finger is relatively large. Hence, to provide an accurate measurement of the finger position, the device must determine some parameter such as the center of the contact area between the finger and the pad. Unfortunately, the contact area varies in size and shape with the pressure applied by the user. Therefore, such determinations are, at best, of limited precision. In practice, users are unable to repeatably execute precise movements.

There are also difficulties arising from false signals when the user inadvertently touches the pad with a finger or a wrist. In some devices, the "clicking" function of a conventional mouse is implemented by tapping on the pad. As a result, such inadvertent activation during typing causes the cursor to jump to a new location in the middle of the typing operation and the text being inserted at the new location.

In previously filed U.S. patent application Ser. No. 10/723,957, which is hereby incorporated by reference, a pointing device that meets these requirements is described. The pointing device utilizes a puck that moves in a defined field of motion when a user applies pressure to the puck via the user's finger. When the user releases the puck, a set of springs returns the puck to its centered position within the field of motion. The position of the puck and the pressure on the puck are determined by electrodes in the device. The position information is used to position a cursor on the display screen. Software on the attached device translates the motion of the puck during the time the user's finger is pressing on the puck into the appropriate cursor motion on the device's display. When the user releases the puck, the coupling between the puck and the cursor position is broken by the software, and hence, the cursor does not move backwards while the puck is being recentered.

While the device taught in the above-described patent application provides significant advantages over the dominant prior art solutions to the pointing device problem in the laptop marketplace, there are a number of areas in which improvements would be useful. In particular, this puck-based pointing device would benefit from the inclusion of additional input functions that provide the functionality and feel of the push buttons on a conventional mouse.

SUMMARY OF THE INVENTION

The present invention includes a pointing device having a puck that is confined to move in a field of motion on a surface. The moveable puck has a first member and a second member that are spaced apart from one another by a resilient spacer when no force is applied between the first and second members. The puck includes a tilt mechanism for allowing the first and second members to assume a tilted configuration with respect to one another in response to a force being applied between the first and second members. The tilted configuration is responsive to the force location, direction, and magnitude. A position detector determines the position of the puck in the puck field of motion and a tilt position of the first member with respect to the second member. The determined tilt position is used to emulate two or more switches that are actuated by varying the tilt position. In one embodiment, the first member includes a first electrode, and the second member includes second and third electrodes. The position detector includes a circuit that measures the capacitances between the first and second electrodes and the first and third electrodes. In one embodiment, the tilt mechanism includes a protrusion on one of the members. In one embodiment, the puck includes a plurality of clickers. Each clicker includes a mechanical device that has a dimension that changes in response to a force applied thereto. The change in dimension is a non-linear function of the applied force. The change in dimension is detectable by a user when the user applies a force to the first member with the user's finger. In one embodiment, the position detector emulates first and second switches that are opened and closed when the first member is tilted with respect to the second member in predetermined configurations.

BRIEF DESCRIPTION OF THE DRAWINGS

FIG. 1 is a top view of pointing device.

FIG. 2 is a cross-sectional view of the pointing device shown in FIG. 1 through line 2-2.

FIG. 5 is a cross-sectional view of a puck that utilizes a dome shaped clicker.

FIG. 6 is a cross-sectional view of pointing device 80 through line 6-6 shown in FIG. 7.

FIG. 7 is a top view of another embodiment of a pointing device according to the present invention.

FIG. 8 is a cross-sectional view of puck 95 when the right half of plate 91 is depressed by applying a force.

FIG. 9 is a cross-sectional view of another embodiment of a pointing device according to the present invention.

FIG. 10 is a top view of the pointing device shown in FIG. 9.

FIG. 11 is a top view of another embodiment of a puck according to the present invention.

FIG. 12 is a cross-sectional view of the puck shown in FIG. 11 through line 12-12.

DETAILED DESCRIPTION OF THE PREFERRED EMBODIMENTS OF THE INVENTION

Figure 3:
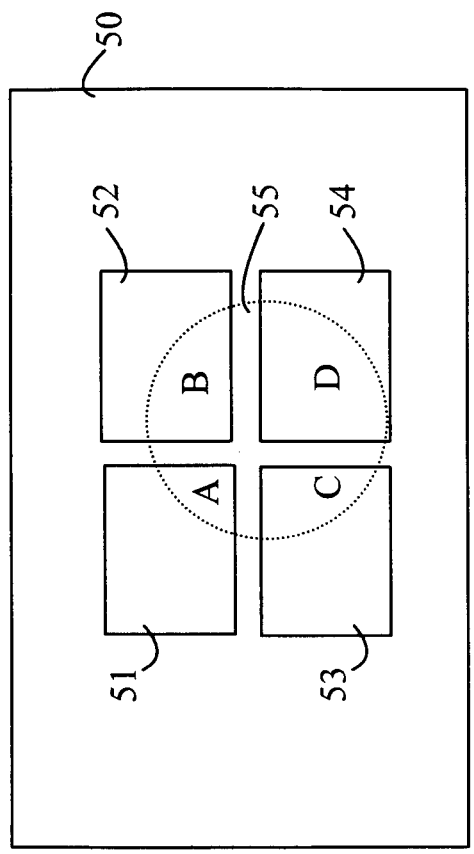
FIG. 3 is a top view of a portion of the surface shown in FIG. 1 over which the puck moves in one embodiment of the present invention.

The manner in which the present invention provides its advantages can be more easily understood with reference to FIGS. 1 and 2, which illustrate a pointing device 10 according to one embodiment of the invention taught in the above-described patent application. FIG. 1 is a top view of pointing device 10, and FIG. 2 is a cross-sectional view of pointing device 10 through line 2-2 shown in FIG. 1. Pointing device 10 includes a puck 11 that moves over a surface 12 of a substrate 15 within a puck field of motion 19 in response to a lateral force applied to puck 11. The force is typically applied to puck 11 by a user's finger. Puck 11 includes a pressure sensing mechanism that measures the vertical pressure applied to puck 11. When the sensed pressure exceeds a predetermined threshold, the cursor tracking function is activated and the cursor moves on the screen in a direction and distance determined by the motion of the puck. In addition, pointing device 10 includes a sensing mechanism for determining the position of puck 11 on surface 12.

When the user releases puck 11 by removing the user's finger 16, puck 11 is returned to its centered position by the springs shown at 13 that connect the puck to the side 14 of the puck field of motion. Since the user's finger is not applying a vertical force to puck 11 during its return, the change in position associated with that return motion is not reported to the host device. That is, the cursor remains at its previous location. This provides a convenient "re-centering" capability, typically achieved on a mouse by lifting and replacing the mouse at the center of the field of motion. Re-centering is particularly necessary in laptop computers, hand-held devices and other miniature applications in which the field of motion is constrained.

The above-described patent application teaches a number of mechanisms for measuring the pressure exerted by the user on the puck, and hence, these mechanisms will not be discussed in detail here. For the purposes of this discussion, it is sufficient to note that a puck having a top surface that can move vertically relative to the bottom surface can be utilized. The top surface is held in place by a spring mechanism. When the user applies pressure to the top surface, the top surface moves toward the bottom surface by an amount that depends on the applied pressure. The distance between the top and bottom surfaces of the puck is measured utilizing one of a number of methods. For example, the top and bottom surfaces of the puck can include conducting layers that form a parallel plate capacitor. The capacitance of this capacitor depends on the distance between the plates, and hence, a measurement of the capacitance provides a measurement of the pressure applied by the user.

The manner in which the position of the puck is sensed in one embodiment is described in detail in the above-identified patent application, and hence, will not be discussed in detail here. For the purposes of this discussion, it will be assumed that a capacitive sensing scheme can be utilized to determine the puck's position. Such a scheme is illustrated in FIG. 3, which is a top view of a portion of surface 12 shown in FIG. 1 over which the puck moves in one embodiment of the present invention. Surface 50 includes four electrodes shown at 51-54 having terminals that are connected to an external circuit. To simplify the drawing, these terminals have been omitted. The puck has a bottom surface that includes an electrode 55 that is shown in phantom in the drawing. Electrodes 51-55 are electrically isolated from one another. For example, electrode 55 can be covered with a layer of dielectric that provides the required insulation while still allowing electrode 55 to slide over the other electrodes. The electrodes can in fact be patterned on the back of the substrate whose surface is shown at 50. This reduces the capacitance between the electrodes and the puck electrode, but can be practical for substrate thicknesses of a few millimeters or less. The overlap between electrode 55 and each of electrodes 51-54 depends on the position of the puck relative to electrodes 51-54. The overlaps between electrode 55 and electrodes 51-54 are denoted by A-D, respectively.

Figure 4:
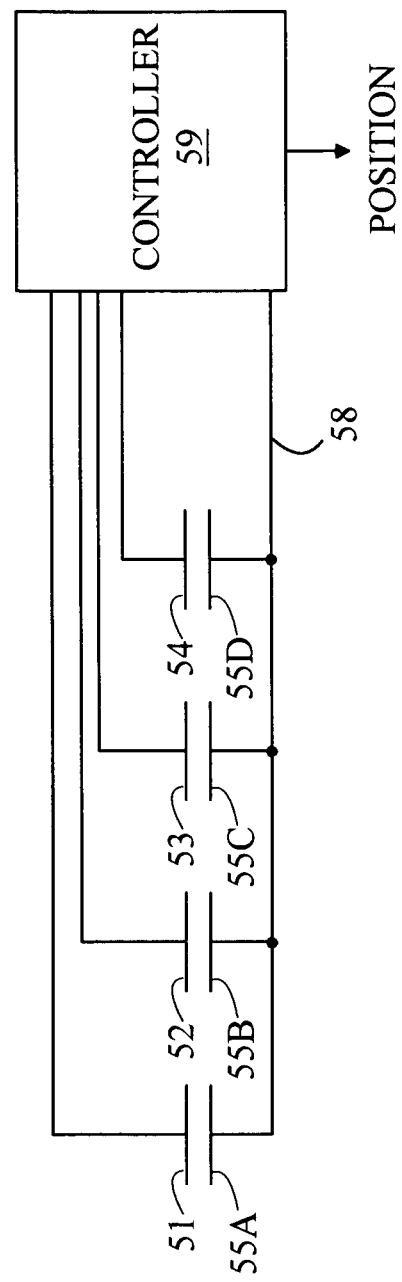
FIG. 4 is a schematic drawing of an equivalent circuit for electrodes 51-55 shown in FIG. 3.

Refer now to FIG. 4, which is a schematic drawing of an equivalent circuit for electrodes 51-55. The portion of electrode 55 that overlaps electrode 51 forms a parallel plate capacitor having a capacitance that is proportional to overlap A. Similarly, the portion of electrode 55 that overlaps electrode 52 forms a parallel plate capacitor that has a capacitance that is proportional to overlap B, and so on. Since all of the capacitors share portions of electrode 55, the equivalent circuit consists of four capacitors connected to a common electrode. This electrode is electrode 55. Hence, by measuring the capacitance between electrode 55 and each of electrodes 51-54, the position of electrode 55 relative to electrodes 51-54 can be determined. This determination can be made by a controller 59, which may be part of the pointing device or part of the host device of which the pointing device forms a part.

In the embodiments discussed above, the electrode on the bottom of the puck is circular in shape to reduce errors arising from the shape of the electrode. The restoring springs allow the puck to rotate somewhat. If the user's finger is not centered on the puck during the motion of the puck, the resultant torque can cause the puck to rotate slightly. If the puck electrode is circularly symmetric, such rotations will not alter the position measurement. If, on the other hand, the puck electrode is not circularly symmetric, the degree of overlap between the puck and the various electrodes will be different for different rotations, even though the center of the puck is at the same location in each case.

To implement a "click", a dome-shaped clicker can be incorporated in the puck. Refer now to FIG. 5, which is a cross-sectional view of a puck 70 that utilizes such a clicker. Puck 70 has a bottom electrode 73 whose capacitance is used to determine the position of the puck in the field of motion as described above. Puck 70 also includes a top electrode 74 that is depressed when the user presses on the electrode. Top electrode 74 is spring mounted to force that electrode against the detents shown at 72 when the user is not pressing on the electrode. In the embodiment shown in FIG. 5, a number of springs 71 provide this function. The distance between electrodes 73 and 74 can be determined by measuring the capacitance between these electrodes. When the user presses lightly on electrode 74, the electrode moves downward until it reaches the top of clicker 75. If the user presses on electrode 74 with a force greater than some threshold force determined by the physical properties of clicker 75 and springs 71, clicker 75 will snap to a configuration in which the dome is inverted. This will relieve the upward force on electrode 74, and electrode 74 will move closer to electrode 75. This new position can be sensed by measuring the capacitance between electrodes 74 and 75.

The clicker shown in FIG. 5 is constructed from a dome-shaped sheet of material that has a height that changes abruptly when the dome is depressed below a predetermined height. The change in states is accompanied by a change in the force applied upward on electrode 74. This provides the user with a sensation like that obtained when a switch is closed. For the purposes of this application, the term "clicker" is defined to include any mechanical device that changes one of its dimensions in response to a force being applied thereto in which the change in dimension is a non-linear function of the applied force. The preferred class of clicker has a bi-stable dimension that switches abruptly between states when the force applied to the clicker is greater than a first threshold force and reverts to its original state when the applied force falls below a second threshold.

The puck shown in FIG. 5 provides a single button function; however, it is not well suited for providing the multiple button functionality associated with conventional pointing devices. Refer now to FIGS. 6 and 7, which illustrate a two-button pointing device according to one embodiment of the present invention. FIG. 6 is a cross-sectional view of pointing device 80 through line 6-6 shown in FIG. 7, and FIG. 7 is a top view of pointing device 80. Pointing device 80 includes a puck 95 that moves over a surface 94 in a field of motion. The position of puck 95 in the field of motion is measured with the aid of a plurality of electrodes in the field of motion and two electrodes located in the puck. Exemplary field of motion electrodes are shown at 88 and 89. The puck electrodes are shown at 93, 86, and 87. To avoid the rotation problems discussed above, electrodes 86 and 87 can be in the shape of half circles and be connected electrically during the measurement of the puck position. To simplify the drawing, the outer shell of puck 95 and the springs that provide the separation force for plates 91 and 92 when no pressure is applied to plate 91 have been omitted.

Pointing device 80 provides a two-button function that is actuated by applying a net force on one or the other of the halves of plate 91. The user can apply the required force by tilting his or her finger or fingers while pressing on the plate 91 so as to provide more force to the half of plate 91 corresponding to the button that the user wishes to actuate. Alternatively, the user can position his or her finger so as to apply the force to only one half of plate 91. Plate 91 includes a ridge 84 that acts as a fulcrum about which plate 91 can pivot. Refer now to FIG. 8, which is a cross-sectional view of puck 95 when the right half of plate 91 is depressed by applying a force as shown at 97. The force causes plate 91 to tilt toward clicker 83 and apply pressure to that clicker thereby deforming the clicker and causing it to assume its depressed height. A protrusion such as protrusions 81 and 85 can be included in plate 91 to facilitate the actuation of clickers 82 and 83, respectively. The average distance between electrode 87 and plate 91 is reduced compared to the distance between electrode 86 and plate 91. This difference is sensed by measuring the capacitance between plate 91 and each of electrodes 86 and 87, respectively.

The embodiment shown in FIGS. 6-8 uses a fulcrum to provide the pivot point for altering the distance between plate 91 and electrodes 86 and 87. However, other pivoting mechanisms can be utilized. Refer now to FIGS. 9 and 10, which illustrate another embodiment of a pointing device according to the present invention. FIG. 9 is a cross-sectional view of pointing device 100 through line 9-9 shown in FIG. 10. FIG. 10 is a top view of pointing device 100. To simplify the following discussion, those elements of pointing device 100 that serve functions analogous to functions described with reference to pointing device 80 have been given the same numeric designations and will not be discussed in detail here. To further simplify the drawing, the outer shell of puck 195 and the springs that provide the separation force for plates 191 and 192 when no pressure is applied to 191 have been omitted.

The puck 195 in pointing device 100 has a top plate 191 that can move relative to bottom plate 192 by pivoting about a protrusion 184. The movement of plate 191 has two degrees of freedom. The first degree of freedom allows plate 191 to rock back and forth about an axis through line 171 shown in FIG. 10. This motion provides the user with a means to depress one or the other of the "buttons" emulated by clickers 82 and 83. For example, the user can click the button associated with clicker 82 by pressing the area of plate 191 over clicker 83 in a manner analogous to that described above with reference to pointing device 80.

The second degree of freedom allows the user to depress both of the "buttons" simultaneously by pressing plate 191 at a point along axis 171 in the region near line 9-9. Hence, pointing device 100 actually provides three possible signals.

The third signal is characterized by an increase in the capacitance between the electrode on plate 191 and both of electrodes 86 and 87.

In the above-described embodiments, the electrode on the bottom plate of the puck was divided into two electrodes that could be connected to the measurement circuitry separately. This arrangement allows the controller to make a determination of the capacitance between each electrode and the electrode on the top plate 191 of the puck and hence sense the position of the top plate with respect to the bottom plate. As noted above, this arrangement allows as many as three distinct "click" signals to be generated. If the bottom electrode on the puck is divided into more electrodes, additional buttons can be implemented in a manner analogous to that described above.

Refer now to FIGS. 11 and 12, which illustrate a puck that can emulate 4 separate buttons that can be pressed individually or in groups of two buttons. FIG. 11 is a top view of puck 200, and FIG. 12 is a cross-sectional view of puck 200 through line 12-12. Puck 200 includes a top plate 291 that can move relative to a bottom plate 292. To simplify the drawing, the outer shell of puck 200 and the springs that provide the separation force for plates 291 and 292 when no pressure is applied to 291 have been omitted. A post 284 attached to the central region of plate 291 sets the minimum distance between the central regions of plates 291 and 292 but allows plate 291 to tip relative to plate 292 to alter the distances between plate 291 and each of the electrodes. A small protrusion is provided over each clicker as discussed above. Exemplary protrusions are shown at 281 and 285.

In operation, the user applies pressure to plate 291, and plate 291 moves toward plate 292 until post 284 engages the surface of plate 292. This change is the distance is used by the controller to determine if the user's finger is present in a manner analogous to that discussed above. During this determination, electrodes 286-287 are connected together to form a single electrode, which, in turn, forms the bottom plate of a capacitor having electrode 295 as its top plate. The change in distance is determined by observing the capacitance of this capacitor.

To actuate one of the buttons, the user applies a differential pressure to the top surface of plate 291. For example, to actuate the button corresponding to clicker 283, a pressure is applied to plate 291 such that the average distance between plates 291 and 292 in the region of electrode 287 decreases. Assume for the moment that this force is centered over protrusion 285. The average distance between plates 291 and 292 in the region of electrode 288 will increase simultaneously. Finally, the average distance between plates 291 and 292 will remain approximately unchanged by this operation. Hence, by measuring the capacitance between electrode 295 and each of electrodes 286-289, the orientation of plate 291 can be determined.

Consider the case in which the pressure is applied between two of the clicker locations, e.g., location 275. In this case, both clicker 276 and 283 would be depressed. The capacitances between electrode 295 and electrode 287 and between electrode 295 and electrode 289 would be at the highest values possible while the capacitances between electrode 295 and electrodes 286 and 288, respectively, would be at the lowest values. Hence, the arrangement shown in FIGS. 11 and 12 can also emulate the simultaneous pressing of two adjacent buttons to further increase the number of distinct signals that can be generated by the puck.

Figure 13:
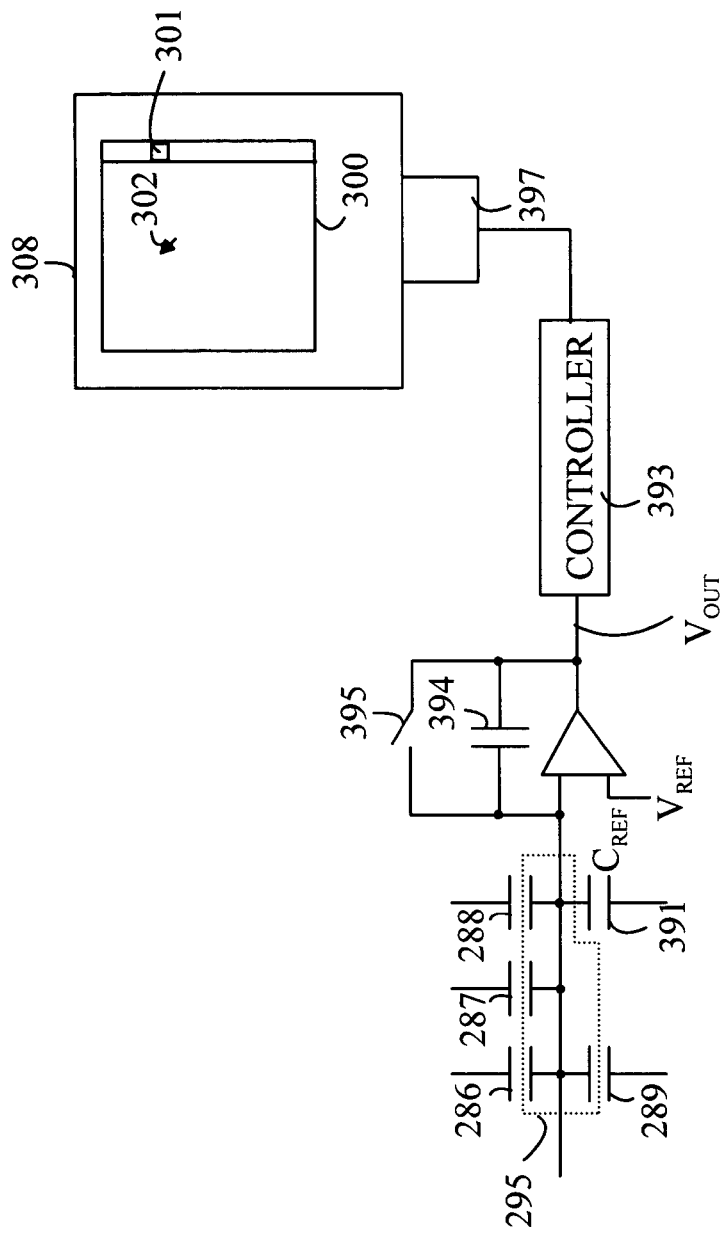
FIG. 13 is a schematic drawing of a circuit for measuring the various capacitances associated with the puck buttons.

The above-described embodiments assume that the pointing device includes a circuit for measuring the capacitance between the top electrode on the puck and each of the electrodes on the bottom plate of the puck. Refer now to FIG. 13, which is a schematic drawing of a circuit for measuring the various capacitances associated with the puck buttons. The circuit measures the capacitance between one set of electrodes at a time. The particular one of these electrodes that is measured by the op-amp is determined by controller 393 by applying pulses to the electrodes in question. To simplify the drawing, the particular connections from the controller to the electrodes have been omitted. When reset switch 395 is first closed, electrode 295 and the output voltage $V_{OUT}$ are forced to the potential $V_{REF}$. After the reset switch is reopened, a drive voltage $V_I$ is applied to one of electrodes 286-289 by controller 393. Consider a measurement on electrode 286. Charge will develop across the relevant capacitor according to $Q_I = C_I \cdot (V_I - V_{REF})$, where $C_I$ is the capacitance of the capacitor formed by electrode 295 and electrode 286. Since no charge can move onto or off the sense electrode 295, the op-amp will apply a voltage across feedback capacitor 394 to keep electrode 295 at potential $V_{REF}$. Thus $V_{OUT} - V_{REF} = C_I / C_{REF} \cdot (V_{REF} - V_I)$, where $C_{REF}$ is the capacitance of capacitor 391. By sequentially making such measurements on each of the driven electrodes, the distance between the top plate on the puck and each of the electrodes corresponding to one of the buttons can be determined. This circuit is advantageous for this application because it allows numerous capacitance measurements to be made using a single op-amp and simple digital drive signals.

It should be noted that an analogous circuit can be used to measure the capacitance between each of the electrodes on the bottom of the puck and each of the position sensing electrodes in the field of motion. The information can be used by controller 393 to input data to a data processing device 397 having a display 308 to control the position of the cursor 302 on the screen 300. The buttons implemented on the puck can be used to signal actions associated with the location of the puck or to control other functions on the screen such as a scroll bar 301.

The embodiments described above utilized a single electrode on the top plate of the puck and two or more electrodes on the bottom plate. However, embodiments in which the top plate has multiple electrodes and the bottom plate has a single electrode can also be constructed. Such embodiments require more electrical connections to the moving plate, and hence, are more complex, but they enable a single sense electrode on the bottom plate to measure both the X-Y position as well as the button status.

The electrical configuration of the electrodes in FIGS. 11 and 12 may also be inverted, so that there is a single drive electrode 295 on the top plate and multiple op-amps connected to electrodes 286, 287, 288 and 289. The measurements from these op-amps can then be used to derive the puck X-Y position in conjunction with substrate electrodes.

The above-described embodiments of the present invention utilize a puck having first and second plates that can be tilted with respect to one another. However, embodiments of the present invention can be constructed utilizing any two members that can be tilted with respect to one another such that the tilted configuration can be detected by the controller.

The embodiments described above utilize clickers that are attached to the bottom plate in the puck. However, embodiments in which the clickers are attached to the top plate and the protrusions for actuating the clickers are attached to the bottom plate can also be constructed.

The above-described embodiments of the present invention utilize springs to set the distance between the top and bottom plates of the puck when no force is applied to the top plate. However, other forms of resilient spacers can be utilized. For example, the springs can be replaced by compressible rubber spacers.

Various modifications to the present invention will become apparent to those skilled in the art from the foregoing description and accompanying drawings. Accordingly, the present invention is to be limited solely by the scope of the following claims.

What is claimed is:

1. A pointing device, comprising:
   a first surface having a puck field of motion defined thereon, wherein the puck field of motion is a planar field of motion;
   a moveable puck confined to move on said first surface, said moveable puck to activate a cursor tracking function in response to a vertical pressure applied to the moveable puck, the moveable puck comprising:
   a first member and a second member, wherein said first and second members are spaced apart from one another by a resilient spacer when no force is applied between said first and second members;
   a tilt mechanism for allowing said first and second members to assume a tilted configuration with respect to one another in response to a force applied between said first and second members, said tilted configuration being responsive to said force location, direction, and magnitude;
   a clicker comprising a mechanical device that has a dimension that changes in response to a force being applied thereto in which the change in dimension is a non-linear function of the applied force; and
   a tilt position sensor that detects a tilt position of said first member with respect to said second member, wherein the tilt position sensor is configured to generate a signal in response to the applied force on the clicker;
   wherein said first member comprises a first electrode and said second member comprises second and third electrodes, and wherein said position sensor comprises a circuit for measuring the capacitances between said first and second electrodes and said first and third electrodes.

2. The pointing device of claim 1 comprising a puck position detector that determines a position of said puck in said puck field of motion.

3. The pointing device of claim 1 wherein said first and second members comprise plates.

4. The pointing device of claim 1 wherein said tilt mechanism comprises a protrusion on one of said members.

5. The pointing device of claim 1 further comprising another clicker comprising another mechanical device that has a dimension that changes in response to the force being applied thereto in which the change in dimension is the non-linear function of the applied force, said change in dimension being detectable by the user when said user applies the force to said first member at a location corresponding to the other clicker.

6. The pointing device of claim 1 wherein said position detector emulates first and second switches that are opened and closed when said first member is tilted with respect to said second member in a predetermined configuration.

7. The pointing device of claim 1 wherein the clicker has a bi-stable dimension that switches abruptly from an original state to an inverted state when the force applied to the clicker is greater than a first threshold force, and reverts to the original state when the applied force falls below a second threshold force.

8. A method of emulating a pointing device having a plurality of buttons, said method comprising:
   providing a moveable puck that moves in a planar field of motion, said puck comprising first and second members that can move relative to one another;
   actuating a clicker when a user applies a force between said first and second members, wherein a dimension of the clicker changes in response to the force being applied thereto in which the change in dimension is a non-linear function of the applied force;
   detecting a relative tilt between said first and second members when the user applies a force between said first and second members;
   wherein said relative tilt is detected by measuring the capacitances between first and second electrodes and first and third electrodes, said first electrode comprising a portion of said first member and said second and third electrodes comprising a portion of said second member; and
   emulating a first button being actuated when said detected tilt has a first value.

9. The method of claim 8 comprising emulating a second button being actuated when said detected tilt has a second value.

10. The method of claim 8 further comprising providing said user with a tactile sensation when said user applies a force that causes said tilt to have said first value.

11. The method of claim 8 wherein the clicker has a bi-stable dimension that switches abruptly from an original state to an inverted state when the force applied to the clicker is greater than a first threshold force, and reverts to the original state when the applied force falls below a second threshold force.

* * * * *